United States Patent
Klosinski et al.

(10) Patent No.: US 9,964,035 B2
(45) Date of Patent: *May 8, 2018

(54) POWER PLANT INCLUDING EXHAUST GAS COOLANT INJECTION SYSTEM AND STEAM GENERATING SYSTEM VIA TURBINE EXTRACTION

(71) Applicant: General Electric Company, Schenectady, NY (US)

(72) Inventors: Joseph Philip Klosinski, Kennesaw, GA (US); Michael Anthony Cocca, Atlanta, GA (US); Alston Ilford Scipio, Mableton, GA (US); Sanji Ekanayake, Mableton, GA (US); Jason Brian Shaffer, Smyrna, GA (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 304 days.

This patent is subject to a terminal disclaimer.

(21) Appl. No.: 14/969,067

(22) Filed: Dec. 15, 2015

(65) Prior Publication Data

US 2017/0167376 A1 Jun. 15, 2017

(51) Int. Cl.
*F02C 7/18* (2006.01)
*F01D 25/30* (2006.01)
(Continued)

(52) U.S. Cl.
CPC .............. *F02C 6/06* (2013.01); *F01D 25/305* (2013.01); *F01K 23/10* (2013.01); *F01K 23/101* (2013.01);
(Continued)

(58) Field of Classification Search
CPC .... F02C 6/08; F02C 9/18; F02C 7/185; F02C 6/18; F01D 25/30; F01D 25/305; F01K 23/10
(Continued)

(56) References Cited

U.S. PATENT DOCUMENTS 4,254,618 A * 3/1981 Elovic ................. F02C 7/185
60/226.1
5,581,996 A * 12/1996 Koch ................... F01D 5/141
60/266

(Continued)

FOREIGN PATENT DOCUMENTS

EP 2 093 399 A1 8/2009

OTHER PUBLICATIONS

Extended European Search Report and Opinion issued in connection with corresponding EP Application No. 16201248.8 dated Jun. 9, 2017.

(Continued)

*Primary Examiner* — William H Rodriguez
(74) *Attorney, Agent, or Firm* — Dority & Manning, P.A.

(57) ABSTRACT

A power plant includes a turbine having a plurality of turbine stages and an extraction port in fluid communication with one or more of the turbine stages. The extraction port provides a flow path for a stream of combustion gas to flow out of the turbine. An exhaust duct is disposed downstream from the turbine and receives exhaust gas from the turbine. The exhaust duct is fluid communication with the extraction port. A coolant injection system injects a coolant into the stream of combustion gas to provide cooled combustion gas to the exhaust duct. The cooled combustion gas flows into the exhaust duct at a temperature that is higher than a temperature of the exhaust gas, thereby increasing the temperature of the exhaust gas within the exhaust duct. The increase in thermal energy may be used to produce steam downstream from the exhaust duct.

20 Claims, 2 Drawing Sheets

(51) Int. Cl.
*F02C 6/06* (2006.01)
*F02C 3/04* (2006.01)
*F02C 6/18* (2006.01)
*H02K 7/18* (2006.01)
*F01K 23/10* (2006.01)

(52) U.S. Cl.
CPC .................. *F02C 3/04* (2013.01); *F02C 6/18* (2013.01); *H02K 7/1823* (2013.01); *Y02E 20/14* (2013.01); *Y02E 20/16* (2013.01)

(58) Field of Classification Search
USPC .......................................................... 60/39.5
See application file for complete search history.

(56) References Cited

U.S. PATENT DOCUMENTS

| | | | | |
|---|---|---|---|---|
| 5,611,197 | A * | 3/1997 | Bunker | F02C 7/185 |
| | | | | 415/115 |
| 5,867,987 | A | 2/1999 | Halimi et al. | |
| 6,065,282 | A * | 5/2000 | Fukue | F02C 7/185 |
| | | | | 415/115 |
| 6,098,395 | A * | 8/2000 | North | F01D 5/085 |
| | | | | 60/782 |
| 6,233,940 | B1 * | 5/2001 | Uji | F01K 21/047 |
| | | | | 60/39.01 |
| 6,250,061 | B1 * | 6/2001 | Orlando | F01D 9/065 |
| | | | | 60/772 |
| 6,442,941 | B1 | 9/2002 | Anand et al. | |
| 6,487,863 | B1 * | 12/2002 | Chen | F02C 6/08 |
| | | | | 60/39.12 |
| 6,543,234 | B2 | 4/2003 | Anand et al. | |
| 6,615,574 | B1 * | 9/2003 | Marks | F02C 7/18 |
| | | | | 60/772 |
| 8,166,747 | B2 * | 5/2012 | Obana | F01K 9/04 |
| | | | | 60/39.511 |
| 8,209,951 | B2 | 7/2012 | Hibshman, II | |
| 8,844,262 | B2 | 9/2014 | Sutterfield | |
| 9,003,762 | B2 * | 4/2015 | Scipio | F01D 25/30 |
| | | | | 60/39.5 |
| 9,103,279 | B2 | 8/2015 | Zhang et al. | |
| 2009/0285680 | A1 * | 11/2009 | Hess | F01D 5/081 |
| | | | | 416/1 |
| 2009/0320496 | A1 * | 12/2009 | Faulder | F01D 25/305 |
| | | | | 60/785 |
| 2010/0175387 | A1 * | 7/2010 | Foust | F01D 9/023 |
| | | | | 60/782 |
| 2010/0215480 | A1 * | 8/2010 | Leach | F02C 9/18 |
| | | | | 415/145 |
| 2013/0219921 | A1 * | 8/2013 | Wiebe | F01D 9/023 |
| | | | | 60/785 |
| 2013/0340439 | A1 * | 12/2013 | Ekanayake | F02C 7/047 |
| | | | | 60/779 |
| 2014/0090354 | A1 * | 4/2014 | Scipio | F01D 25/30 |
| | | | | 60/39.5 |
| 2014/0230444 | A1 * | 8/2014 | Hao | F01D 25/305 |
| | | | | 60/772 |
| 2014/0373504 | A1 * | 12/2014 | Broker | F01D 25/30 |
| | | | | 60/39.5 |
| 2015/0089955 | A1 | 4/2015 | Knapp et al. | |
| 2015/0132101 | A1 * | 5/2015 | Marsh | F01D 25/12 |
| | | | | 415/1 |
| 2015/0361890 | A1 * | 12/2015 | Suciu | F02C 9/18 |
| | | | | 60/785 |
| 2016/0123190 | A1 * | 5/2016 | Klosinski | F02C 6/04 |
| | | | | 60/772 |
| 2016/0273408 | A1 * | 9/2016 | Ekanayake | F02C 3/04 |
| 2016/0273409 | A1 * | 9/2016 | Ekanayake | F01K 23/105 |
| 2016/0376958 | A1 * | 12/2016 | Davis, Jr. | F01N 3/05 |
| | | | | 60/39.5 |

OTHER PUBLICATIONS

Co-pending U.S. Appl. No. 14/969,032, filed Dec. 15, 2015.
Co-pending U.S. Appl. No. 14/969,051, filed Dec. 15, 2015.
Co-pending U.S. Appl. No. 14/969,594, filed Dec. 15, 2015.
Co-pending U.S. Appl. No. 14/969,079, filed Dec. 15, 2015.
Co-pending U.S. Appl. No. 14/969,098, filed Dec. 15, 2015.
Co-pending U.S. Appl. No. 14/969,224, filed Dec. 15, 2015.
Co-pending U.S. Appl. No. 14/969,118, filed Dec. 15, 2015.
Co-pending U.S. Appl. No. 14/969,142, filed Dec. 15, 2015.
Co-pending U.S. Appl. No. 14/969,157, filed Dec. 15, 2015.
Co-pending U.S. Appl. No. 14/969,165, filed Dec. 15, 2015.
Co-pending U.S. Appl. No. 14/969,185, filed Dec. 15, 2015.
Co-pending U.S. Appl. No. 14/969,200, filed Dec. 15, 2015.

* cited by examiner

POWER PLANT INCLUDING EXHAUST GAS COOLANT INJECTION SYSTEM AND STEAM GENERATING SYSTEM VIA TURBINE EXTRACTION

FIELD OF THE INVENTION

The present invention generally relates to a gas turbine power plant such as a combined cycle or cogeneration power plant. More particularly, the present invention relates to extracting combustion gas from a turbine of the gas turbine to modulate steam and power output of the power plant.

BACKGROUND OF THE INVENTION

A gas turbine power plant such as a combined cycle or cogeneration power plant generally includes a gas turbine having a compressor, a combustor, a turbine, a heat recovery steam generator (HRSG) that is disposed downstream from the turbine and a steam turbine in fluid communication with the HRSG. During operation, air enters the compressor via an inlet system and is progressively compressed as it is routed towards a compressor discharge or diffuser casing that at least partially surrounds the combustor. At least a portion of the compressed air is mixed with a fuel and burned within a combustion chamber defined within the combustor, thereby generating high temperature and high pressure combustion gas.

The combustion gas is routed along a hot gas path from the combustor through the turbine where they progressively expand as they flow across alternating stages of stationary vanes and rotatable turbine blades which are coupled to a rotor shaft. Kinetic energy is transferred from the combustion gas to the turbine blades thus causing the rotor shaft to rotate. The rotational energy of the rotor shaft may be converted to electrical energy via a generator. The combustion gas exits the turbine as exhaust gas and the exhaust gas enters the HRSG. Thermal energy from the exhaust gas is transferred to water flowing through one or more heat exchangers of the HRSG, thereby producing superheated steam. The superheated steam is then routed into the steam turbine which may be used to generate additional electricity, thus enhancing overall power plant efficiency.

Regulatory requirements for low emissions from gas turbine based power plants have continually grown more stringent over the years. Environmental agencies throughout the world are now requiring even lower levels of emissions of oxides of nitrogen (NOx) and other pollutants and carbon monoxide (CO) from both new and existing gas turbines.

Traditionally, due at least on part to emissions restrictions, the gas turbine load for a combined cycle or cogeneration power plant has been coupled to or driven by steam production requirements for the power plant and not necessarily by grid power demand. For example, to meet power plant steam demand while maintaining acceptable emissions levels, it may be necessary to operate the gas turbine at full-speed full-load conditions, even when grid demand or power plant demand for electricity is low, thereby reducing overall power plant efficiency.

BRIEF DESCRIPTION OF THE INVENTION

Aspects and advantages of the invention are set forth below in the following description, or may be obvious from the description, or may be learned through practice of the invention.

One embodiment of the present invention is power plant. The power plant includes a combustor and a turbine that is disposed downstream from the combustor. The turbine includes a plurality of turbine stages and an extraction port in fluid communication with one or more of the turbine stages. The extraction port provides a flow path for a stream of combustion gas to flow out of the turbine. An exhaust duct is disposed downstream from the turbine so as to receive exhaust gas from the turbine. The exhaust duct is in fluid communication with the extraction port. The power plant further includes a coolant injection system that injects a coolant into the stream of combustion gas to provide cooled combustion gas to the exhaust duct. The cooled combustion gas flows into the exhaust duct at a temperature that is higher than a temperature of the exhaust gas from the turbine. The cooled combustion gas and the exhaust gas mix together within the exhaust duct to provide a heated exhaust gas downstream of the exhaust duct.

Another embodiment of the present disclosure includes a power plant. The power plant includes a gas turbine having a compressor, a combustor downstream from the compressor and a turbine downstream from the combustor. The turbine includes a first stage that is in fluid communication with a first extraction port and a second stage that is in fluid communication with a second extraction port. The first and second extraction ports provide for extraction of a stream of combustion gas from the turbine downstream from the combustor. An exhaust duct is disposed downstream from the turbine and receives exhaust gas from the turbine. The exhaust duct is in fluid communication with the first extraction port and the second extraction port. The power plant further includes a coolant injection system. The coolant injection system injects a coolant into the stream of combustion gas flowing from at least one of the first and second extraction ports to provide cooled combustion gas to the exhaust duct. The cooled combustion gas flows into the exhaust duct at a temperature that is higher than a temperature of the exhaust gas. The cooled combustion gas and the exhaust gas mix together within the exhaust duct to produce an exhaust gas mixture.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
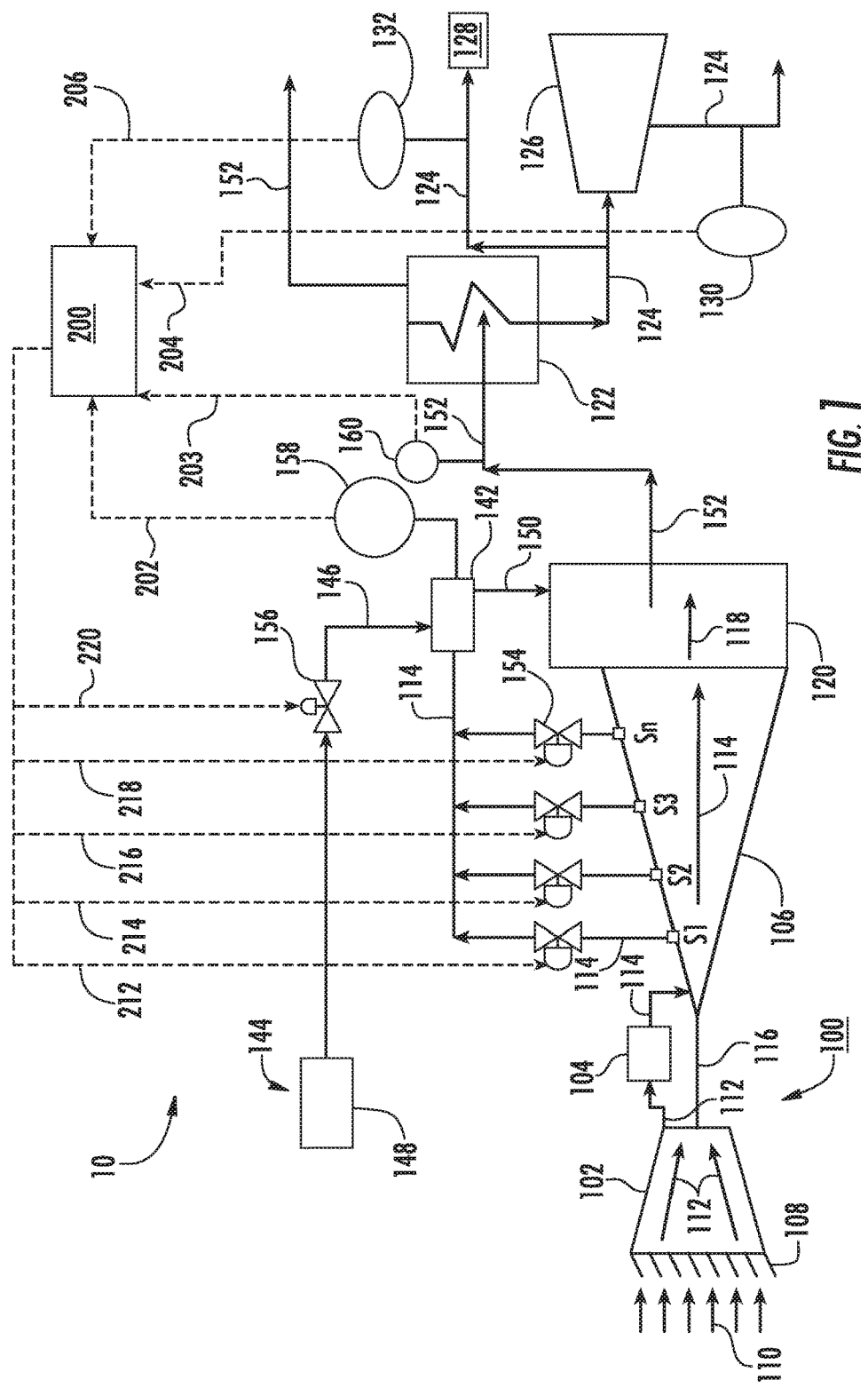
FIG. 1 is a schematic diagram of an exemplary gas turbine based cogeneration power plant within the scope of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

In a conventional co-generation power plant, fuel and air are supplied to a gas turbine. Air passes through an inlet of the gas turbine into the compressor section upstream of combustors in the gas turbine. After the air is heated by combustors, the heated air and other gases produced in the process (i.e., combustion gas) pass through the turbine section. The full volume of exhaust gas from the gas turbine passes from the turbine section to an exhaust section of the gas turbine, and flows to a heat recovery steam generator (HRSG) that extracts heat or thermal energy from the exhaust gas via one or more heat exchangers to produce steam.

In certain instances, the demand for steam may be lower than the amount of steam that could be generated by the gas turbine exhaust, some of the exhaust gas could be directed away from the heat recovery steam generator, such as being transported to an exhaust stack that filters the exhaust gas prior to being released into the atmosphere. Alternatively, if steam production is in higher demand than the steam generated by the gas turbine exhaust, then an increase in exhaust gas from the gas turbine could be produced to generate the steam desired.

The present embodiments provide a system to cool or temper hot combustion gas extracted directly from a turbine of a gas turbine prior to being mixed with exhaust gas flowing from an outlet of the turbine. Although the combustion gas is cooled via the coolant, the cooled combustion gas is still significantly hotter than exhaust gas flowing from the turbine. As a result, the increase in thermal energy may be used to enhance steam production for a steam turbine downstream from the turbine, for heat production and/or for other industrial processes. The system can be used in a cogeneration system such that the cogeneration system can produce a higher quantity of steam without producing a proportional increase of power. The embodiment system thus provides an efficient use of the fuel input into the cogeneration system, and avoids wasteful production of undesired power by the gas turbine.

The embodiments provided herein provide various technical advantages over existing cogenerations or combined cycle power plants. For example, the system provided herein may include the ability to modulate steam production at a desired level while maintaining thermal and other operating efficiencies; the ability to provide a higher temperature gas to produce more steam downstream of the gas turbine; the ability to operate at a lower power output on the gas turbine and generate more steam; the ability to minimize wasteful products (i.e., producing unnecessary power in the gas turbine); and the ability to operate a cogeneration system at a more cost effective and efficient capacity.

Referring now to the drawings, wherein identical numerals indicate the same elements throughout the figures, FIG. 1 provides a functional block diagram of an exemplary gas turbine power plant 10 with steam production capability. The power plant 10 comprises a gas turbine 100 that may incorporate various embodiments of the present invention. The gas turbine 100 generally includes, in serial flow order, a compressor 102, one or more combustors 104 and a turbine 106. The gas turbine 100 may also include inlet guide vanes 108 disposed at an inlet of the compressor 108. In operation, air 110 flows across the inlet guide vanes 108 and into the compressor 102. The compressor 102 imparts kinetic energy to the air 110 to produce compressed air as indicated schematically by arrows 112.

The compressed air 112 is mixed with a fuel such as natural gas from a fuel supply system to form a combustible mixture within the combustor(s) 104. The combustible mixture is burned to produce combustion gas as indicated schematically by arrows 114 having a high temperature, pressure and velocity. The combustion gas 114 flows through various turbine stages S1, S2, S3, Sn of the turbine 106 to produce work. The turbine 106 may have two or more stages, for example, a low pressure section and a high pressure section. In another embodiment, the turbine 106 may be a two-shaft turbine that includes a low pressure section and a high pressure section. The turbine 106 may have 4 or more stages. The turbine 106 may be connected to a shaft 116 so that rotation of the turbine 106 drives the compressor 102 to produce the compressed air 112. Alternately or in addition, the shaft 116 may connect the turbine 106 to a generator (not shown) for producing electricity. The combustion gas 114 loses thermal and kinetic energy as it flows through the turbine 106 and exits the turbine 106 via an exhaust duct 120 as exhaust gas 118.

The exhaust duct 120 may be fluidly coupled to a heat exchanger 122 via various pipes, ducts, valves and the like. The heat exchanger 122 may be a standalone component or may be a component of a heat recovery steam generator (HRSG). In various embodiments, the heat exchanger 122 is used to extract thermal energy from the exhaust gas 118 to produce steam 124. The steam 124 may then be routed to a steam turbine 126 via various pipes, valves conduits or the like to produce additional power or electricity. At least a portion of the steam 124 may be piped from the heat exchanger 122 to an onsite or offsite facility 128 that distributes the steam to users or utilizes the steam for secondary operations such as heat production or other industrial operations or processes. In one embodiment, the steam 124 may be piped downstream from the steam turbine 126 and further utilized for various secondary operations such as heat production or other secondary operations. Steam flow rate or output from the heat exchanger 122 may be monitored via one or more flow monitors. For example, in one embodiment, a flow monitor 130 may be provided downstream from the heat exchanger 122. In one embodiment, a flow monitor 132 may be disposed downstream from the steam turbine 126.

Figure 2:
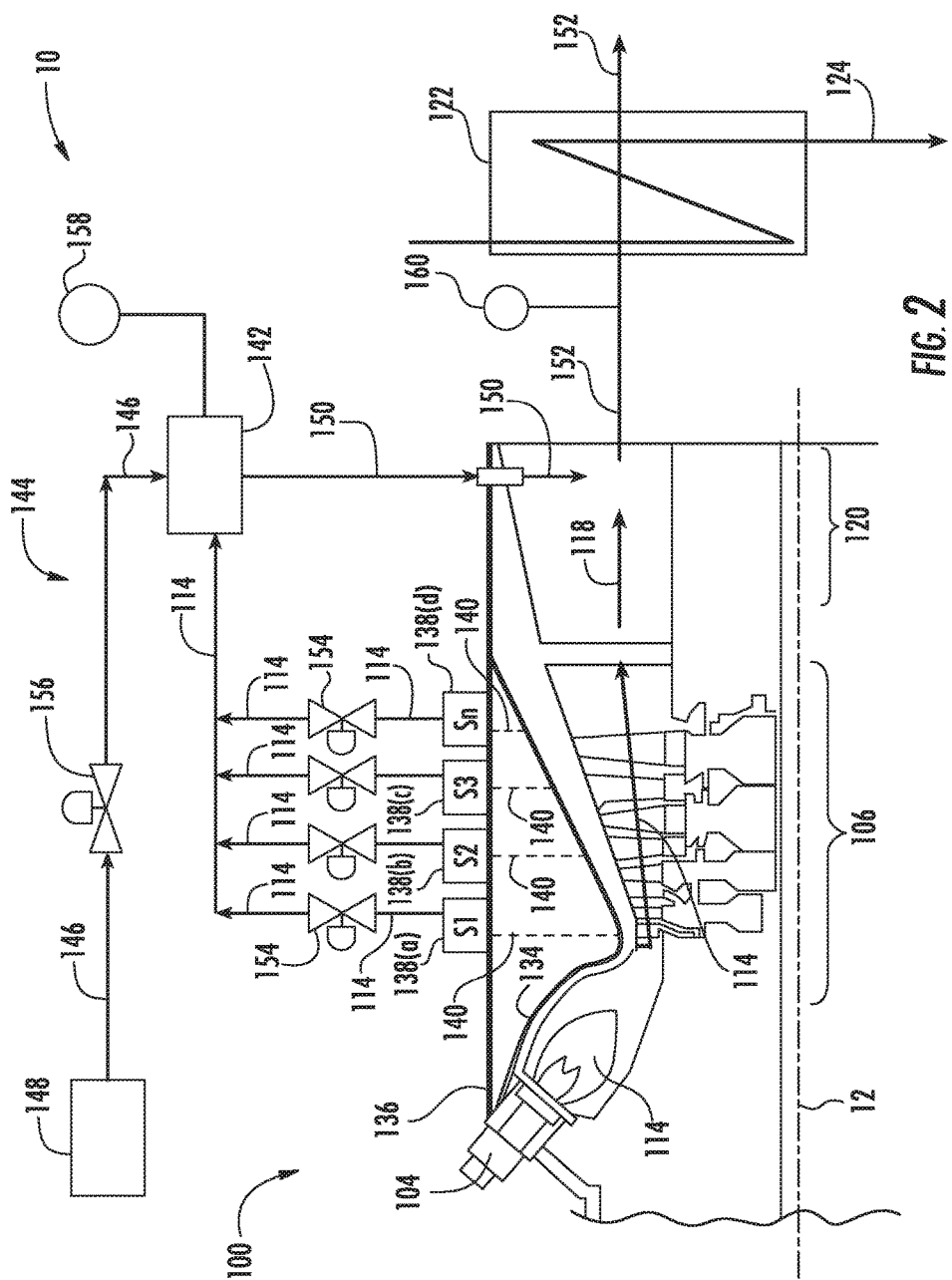
FIG. 2 is a simplified cross sectioned side view of a portion of an exemplary gas turbine according to at least one embodiment of the present invention.

FIG. 2 provides a simplified cross sectional side view of a portion of an exemplary gas turbine 100 including a portion of the combustor 104, the turbine 106 and the exhaust duct 120 as may incorporate various embodiments of the present invention. In one embodiment, as shown in FIG. 2, the turbine 106 includes an inner turbine casing 134 and an outer turbine casing 136. The inner and outer turbine casings 134, 136 extend circumferentially about an axial centerline 12 of the gas turbine 100. The inner turbine casing 134 at least partially encases the various stages S1, S2, S3, Sn of the turbine 106. The turbine casings 134, 136 are normally sealed with only two openings: a combustion gas inlet at the upstream of the turbine 106, and an exhaust gas outlet at a downstream end of the turbine 106 that is operably connected to the exhaust duct 120. Conventionally, the entire volume of combustion gas 114 passes through the turbine 106 within the inner and outer turbine casings 134, 136, into the exhaust duct 120 and at least a portion of the exhaust gas 118 may be directed to the heat exchanger 122 and/or the HRSG.

In various embodiments, if it is determined that the demand for steam production is higher than the demand for power produced by the gas turbine 100 a portion of the combustion gas 114 may be extracted from one or more of the turbine stages S1, S2, S3, Sn via one or more corresponding extraction ports 138. Four extraction ports 138(a-d) are shown for illustration. However, the turbine 106 may include any number of extraction ports 138. For example, the turbine 106 may include two extraction ports 138, at three extraction ports 138 or four or more extraction ports 138. Each extraction port 138 is fluidly coupled to one or more of the turbine stages S1, S2, S3, Sn. Each extraction port 138 provides a flow path for a stream of the combustion gas 114 to flow out of the turbine 106 from a point that is downstream from the combustor 104 but upstream from the exhaust duct 120.

As shown in FIG. 2, one or more of the extraction ports 138(a-d) may be in fluid communication with one or more of the turbine stages S1, S2, S3 or Sn via one or more extraction pipes 140. The extraction pipes 140 and the extraction ports 138 provide for fluid communication of the combustion gas 114 through the inner and outer turbine casings 134, 136 and out of the turbine 106 to obtain gas at higher temperatures than the exhaust gas 118 flowing through the exhaust duct 120.

As shown in FIG. 2, the stages in the turbine 106 are successive such that the combustion gas 114 flows through the stages from S1 to a last stage Sn. Temperature of the combustion gas 114 decreases with each successive stage. For example, the combustion gas at the S1 stage has a higher temperature than at the subsequent stages, S2, S3, Sn, etc. . . . Turbine stage S1 is the first stage and receives hot combustion gas 114 directly from the combustor 104. The exhaust gas 118 is at a lower temperature than the combustion gas 114 within the turbine 106 and therefore has less thermal energy.

In particular embodiments, as shown in FIGS. 1 and 2, a mixing chamber 142 may be fluidly coupled to and positioned downstream from the extraction port(s) 138. The mixing chamber 142 may be fluidly coupled to the exhaust duct 120 via various pipes, conduits, valves or the like. The mixing chamber 142 may be configured to receive the stream of combustion gas 114 from the extraction port(s) 138 and pass the combustion gas 114 on to the exhaust duct 120 upstream from the heat exchanger 122. In addition or in the alternative, the mixing chamber 142 may be fluidly coupled directly to the heat exchanger 122 and/or the HRSG via various pipes, conduits, valves or the like.

In various embodiments, as shown in FIGS. 1 and 2, one or more of the extraction ports 138 is in fluid communication with a coolant injection system 144. In particular embodiments, one or more of the extraction ports 138 is in fluid communication with the coolant injection system 144 and the exhaust duct 120 via the mixing chamber 142. The coolant injection system 144 may include spray nozzles, a spray tower, a scrubber or other various components (not shown) for injecting a coolant 146 from a coolant supply 148 into the stream of combustion gas 114 flowing from one or more of the extraction ports 138.

In particular embodiments, the coolant 146 and the combustion gas 114 are mixed upstream from the exhaust duct 120 in the mixing chamber 142. In this manner, the coolant 146 may be used to reduce or control the temperature of the combustion gas 114 upstream from the heat exchanger 122 and/or the exhaust duct 120, thereby providing a cooled combustion gas 150 to the exhaust duct 120. The coolant 146 may be any liquid or gas that may be mixed with the combustion gas 150 for its intended purpose. For example, in one embodiment the coolant 146 is water. In one embodiment the coolant 146 comprises steam.

The cooled combustion gas 150 which is at a higher temperature than the exhaust gas 118 flowing from the turbine 106 may be mixed within the exhaust duct 120 and/or downstream from the exhaust duct 120 with the relatively cooler exhaust gas 118 to provide a thermally enhanced (hotter) stream of an exhaust gas mixture 152 to the heat exchanger 122, thereby enhancing steam production capability, particularly at lower turbine load operating conditions and to meet specific thermal design tolerances of the heat exchanger 122, the exhaust duct 120 and/or HRSG components.

Referring back to FIG. 1, in particular embodiments, a controller 200 may be used to determine the desired steam production capacity and to generate and/or send appropriate control signals to various control valves 154 of at least one of the turbine stages S1-Sn and/or to one or more control valves 156 of the coolant injection system 144. The controller 200 may be a microprocessor based processor that includes a non-transitory memory and that has the capability to calculate algorithms. The controller 200 may incorporate a General Electric SPEEDTRONIC™ Gas Turbine Control System, such as is described in Rowen, W. I., "SPEEDTRONIC™ Mark V Gas Turbine Control System", GE-3658D, published by GE Industrial & Power Systems of Schenectady, N.Y. The controller 200 may also incorporate a computer system having a processor(s) that executes programs stored in a memory to control the operation of the gas turbine using sensor inputs and instructions from human operators.

The controller 200 is programmed to determine a desired temperature of the exhaust gas mixture 152 required to generate the desired amount of steam flow, and to regulate combustion gas flow through valve(s) 154 and/or coolant injection system flow through valve(s) 156 to achieve the desired temperature of the stream of the exhaust gas mixture 152 being sent to the heat exchanger 122.

The controller 200 may receive input data signals, such as combustion gas temperature 202 from a temperature monitor 158 in fluid communication with one or more of the extraction ports 138 and disposed upstream or downstream from the mixing chamber 142, steam flow data 204 from flow monitor 130 and/or steam flow data 206 from flow monitor 132. The controller 200 may receive input data signals, such as exhaust gas mixture temperature 203 from a temperature monitor 160 disposed downstream from the exhaust duct 120 and upstream from the heat exchanger 122. The controller 200 may actuate valve(s) 154 and/or valve(s) 156 to control exhaust gas extraction from the turbine stages S1-Sn and/or coolant flow rate to produce the desired temperature of the exhaust gas mixture 152 to flow to the heat exchanger 122. Flow output from the steam turbine 126 may be monitored using flow monitor 130. Flow output to secondary operations may be monitored using flow monitor 132. Controller 200 may actuate valve(s) 154 and/or valve(s) 156 to control combustion gas extraction flow from the turbine stages S1-Sn and/or coolant flow to the mixing chamber 142 to produce the desired temperature of steam and/or steam flow rate to the steam turbine 126 based at least in part on flow output as measured by at least one of flow monitors 130, 132.

Data signals received by the controller 200, such as combustion gas temperature, exhaust gas temperature, exhaust gas mixture temperature and steam flow rate may be analyzed to compare with a predetermined desired amount of steam flow. The controller 200 may use the received data signals to determine if an increase in exhaust gas mixture temperature would be desired. Calculations include determining the quantity of steam needed and the amount of power desired, and determining the temperature and quantity of combustion gas needed to produce the desired quantity of steam.

After determining the desired temperature and quantity of the exhaust gas mixture 152 required for the heat exchanger 122 to produce desired steam quantity, the controller 200 may generate and send a signal 212, 214, 216, 218 to the receiver of the appropriate valve 154 to extract combustion gas 114 through the turbine casings 134, 136 at the appropriate turbine stage S1, S2, S3, Sn. In addition, the controller 200 may send a signal 220 to the receiver of valve 156 to modulate flow of the coolant 146 at a desired amount into the mixing chamber 142 and/or into the stream of combustion gas 114 from the extraction ports 138 to cool the extracted combustion gas 114 to a desired temperature. The system or systems provided herein automatically blend the exhaust gas 118 with the stream of cooled combustion gas 150 so that the exhaust gas mixture temperature is above a nominal exhaust gas temperature but below the thermal limits of the heat exchanger 122 or HRSG.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed:

1. A power plant, comprising:
a combustor;
a turbine disposed downstream from the combustor, the turbine including a plurality of turbine stages and an extraction port in fluid communication with one or more of the turbine stages, wherein the extraction port provides a flow path for a stream of combustion gas to flow out of the turbine;
an exhaust duct downstream from the turbine, wherein the exhaust duct receives exhaust gas from the turbine and is in fluid communication with the extraction port; and
a coolant injection system, wherein the coolant injection system injects a coolant into the stream of combustion gas to provide cooled combustion gas to the exhaust duct, wherein the cooled combustion gas flows into the exhaust duct at a temperature that is higher than a temperature of the exhaust gas, wherein the cooled combustion gas and the exhaust gas mix together within the exhaust duct to provide an exhaust gas mixture to one or more components disposed downstream of the exhaust duct.

2. The power plant as in claim 1, wherein the coolant is water.

3. The power plant as in claim 1, wherein the coolant is steam.

4. The power plant as in claim 1, wherein the turbine comprises an inner casing, an outer casing and an extraction pipe in fluid communication with at least one turbine stage of the plurality of stages, wherein the extraction pipe is in fluid communication with the extraction port.

5. The power plant as in claim 1, further comprising a heat exchanger disposed downstream from the exhaust duct, wherein the heat exchanger receives the exhaust gas mixture from the exhaust duct to produce steam.

6. The power plant as in claim 5, further comprising a steam turbine disposed downstream from the heat exchanger, wherein the heat exchanger provides steam to the steam turbine.

7. The power plant as in claim 5, wherein at least a portion of the steam from the heat exchanger is directed to at least one of an onsite or offsite facility.

8. The power plant as in claim 1, further comprising a controller electronically coupled to a first control valve fluidly connected between the extraction port and the exhaust duct and a second control valve fluidly connected to the coolant injection system.

9. The power plant as in claim 8, further comprising a temperature monitor electronically coupled to the controller and in fluid communication with the extraction port upstream from the exhaust duct, wherein the controller actuates at least one of the first control valve and the second control valve in response to a signal provided by the temperature monitor to the controller.

10. The power plant as in claim 8, further comprising a heat exchanger disposed downstream from the exhaust duct and a flow monitor disposed downstream from the heat exchanger electronically coupled to the controller, wherein the controller actuates at least one of the first control valve and the second control valve in response to a flow output signal provided by the flow monitor to the controller.

11. A power plant, comprising:
a gas turbine having a compressor, a combustor downstream from the compressor and a turbine downstream from the combustor, the turbine including a first stage in fluid communication with a first extraction port and a second stage in fluid communication with a second extraction port, wherein the first and second extraction ports provide for extraction of a stream of combustion gas from the turbine downstream from the combustor;
an exhaust duct downstream from the turbine, wherein the exhaust duct receives exhaust gas from the turbine and is in fluid communication with the first extraction port and the second extraction port; and
a coolant injection system, wherein the coolant injection system injects a coolant into the stream of combustion gas flowing from at least one of the first and second extraction ports to provide cooled combustion gas to the exhaust duct, wherein the cooled combustion gas flows into the exhaust duct at a temperature that is higher than a temperature of the exhaust gas, wherein the cooled combustion gas and the exhaust gas mix together within the exhaust duct to produce an exhaust gas mixture.

12. The power plant as in claim 11, wherein the coolant is water.

13. The power plant as in claim 11, wherein the coolant is steam.

14. The power plant as in claim 11, wherein the turbine comprises an inner casing, an outer casing, a first extraction pipe in fluid communication with the first turbine stage and the first extraction port and a second extraction pipe in fluid communication with the second turbine stage and the second extraction port.

15. The power plant as in claim 11, further comprising a heat exchanger disposed downstream from the exhaust duct, wherein the heat exchanger receives the exhaust gas mixture from the exhaust duct and produces steam.

16. The power plant as in claim 15, further comprising a steam turbine disposed downstream from the heat exchanger, wherein the heat exchanger provides at least a portion of the steam to the steam turbine.

17. The power plant as in claim 15, wherein at least a portion of the steam from the heat exchanger is directed to at least one of an onsite and an offsite facility.

18. The power plant as in claim 11, further comprising a controller electronically coupled to a first control valve fluidly connected between the first extraction port and the exhaust duct, a second control valve fluidly connected between the second extraction port and the exhaust duct and a third control valve fluidly connected to the coolant injection system.

19. The power plant as in claim 18, further comprising a temperature monitor electronically coupled to the controller and in fluid communication with at least one of the first extraction port and the second extraction port upstream from the exhaust duct, wherein the controller actuates at least one of the first control valve, the second control valve and the third control valve in response to a signal provided by the temperature monitor to the controller.

20. The power plant as in claim 18, further comprising a heat exchanger disposed downstream from the exhaust duct and a flow monitor disposed downstream from the heat exchanger electronically coupled to the controller, wherein the controller actuates at least one of the first control valve, the second control valve and the third control valve in response to a flow output signal provided by the flow monitor to the controller.

\* \* \* \* \*